United States Patent
Gelbke et al.

(10) Patent No.: US 7,851,082 B2
(45) Date of Patent: Dec. 14, 2010

(54) ACCUMULATOR WITH COVER HAVING TIP-SAFE FEATURES

(75) Inventors: Manfred Gelbke, Bad Staffelstein (DE); Richard Kermas, Bad Staffelstein (DE); Peter Schumann, Untersiemau (DE); Peter Holzleitner, Linz (AT); Norbert Maleschitz, Thalheim bei Wels (AT); Thomas Bawart, Linz (AT)

(73) Assignees: Akkumulatorenfabrik Moll GmbH & Co. KG, Bad Staffelstein (DE); Banner GmbH, Linz (AT)

( * ) Notice: Subject to any disclaimer, the term of this patent is extended or adjusted under 35 U.S.C. 154(b) by 28 days.

(21) Appl. No.: 10/321,146

(22) Filed: Dec. 17, 2002

(65) Prior Publication Data

US 2003/0157401 A1 Aug. 21, 2003

(30) Foreign Application Priority Data

Dec. 17, 2001 (DE) ............................ 101 61 895

(51) Int. Cl.
*H01M 2/04* (2006.01)
*H01M 2/12* (2006.01)

(52) U.S. Cl. .................... 429/175; 429/84; 429/89
(58) Field of Classification Search ............ 429/82, 429/89, 175, 77, 177, 185, 203
See application file for complete search history.

(56) References Cited

U.S. PATENT DOCUMENTS

| | | | |
|---|---|---|---|
| 3,597,280 A * | 8/1971 | Hennen | 429/88 |
| 4,275,128 A | 6/1981 | Sano | |
| 4,278,742 A | 7/1981 | Oxenreider et al. | |
| 6,277,517 B1 | 8/2001 | Thomas et al. | |
| 6,368,741 B1 * | 4/2002 | Hackel et al. | 429/53 |
| 2001/0041286 A1 * | 11/2001 | Cramer | 429/89 |
| 2003/0017381 A1 * | 1/2003 | Mittal et al. | 429/89 |

FOREIGN PATENT DOCUMENTS

| | | |
|---|---|---|
| DE | 1 277 396 | 9/1968 |
| DE | 92 09 986 | 10/1992 |
| DE | 42 26 809 | 2/1994 |
| DE | 44 40 852 | 6/1996 |
| DE | 195 32 934 | 3/1997 |
| DE | 19532934 | 3/1997 |
| DE | GB 29821994.8 | 2/1999 |

(Continued)

*Primary Examiner*—Keith Walker
(74) *Attorney, Agent, or Firm*—Dilworth & Barrese, LLP.

(57) ABSTRACT

An accumulator, particularly a lead accumulator, has a housing, which encloses multiple cells, and a block cover, which terminates the housing, including a bottom cover (1) and a top cover (2), between which a gas chamber for acid separation is implemented, which is divided into multiple cavities (3-8), corresponding to the number of cells, and which has at least one vent opening, a fill opening (9-14) being provided for each cell in the bottom cover (1). In order to improve an accumulator of this type, a gas outlet (15-20), which discharges into the associated cavity (3-8), is provided for each cell at a distance from the fill opening (9-14) in the bottom cover (1), its size being dimensioned so that in the event of brief tipping of the accumulator, no more acid may escape from the cell than is received by the cavity (3-8) assigned thereto (FIG. 2).

26 Claims, 12 Drawing Sheets

FOREIGN PATENT DOCUMENTS

Figure 1:
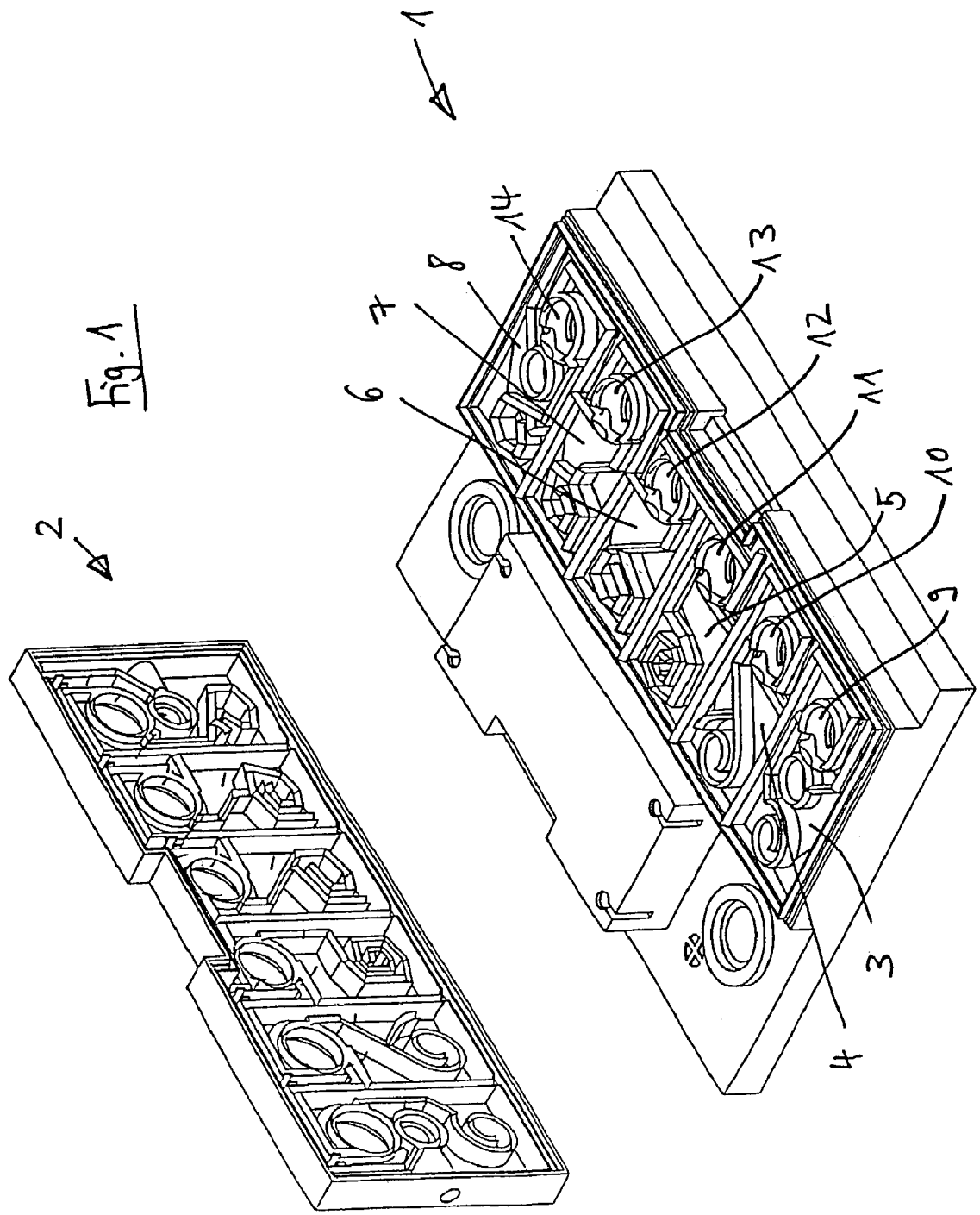

| | | |
|---|---|---|
| DE | 100 23 747 | 11/2001 |
| EP | 0107469 | 3/1984 |
| EP | 0 501 709 | 9/1992 |
| EP | 0570703 | 11/1993 |
| EP | 0 584 490 | 3/1994 |
| EP | 0 584 528 | 3/1994 |
| EP | 0763862 | 3/1997 |
| EP | 1 017 119 | 7/2000 |
| FR | 2 472 274 | 6/1981 |

* cited by examiner

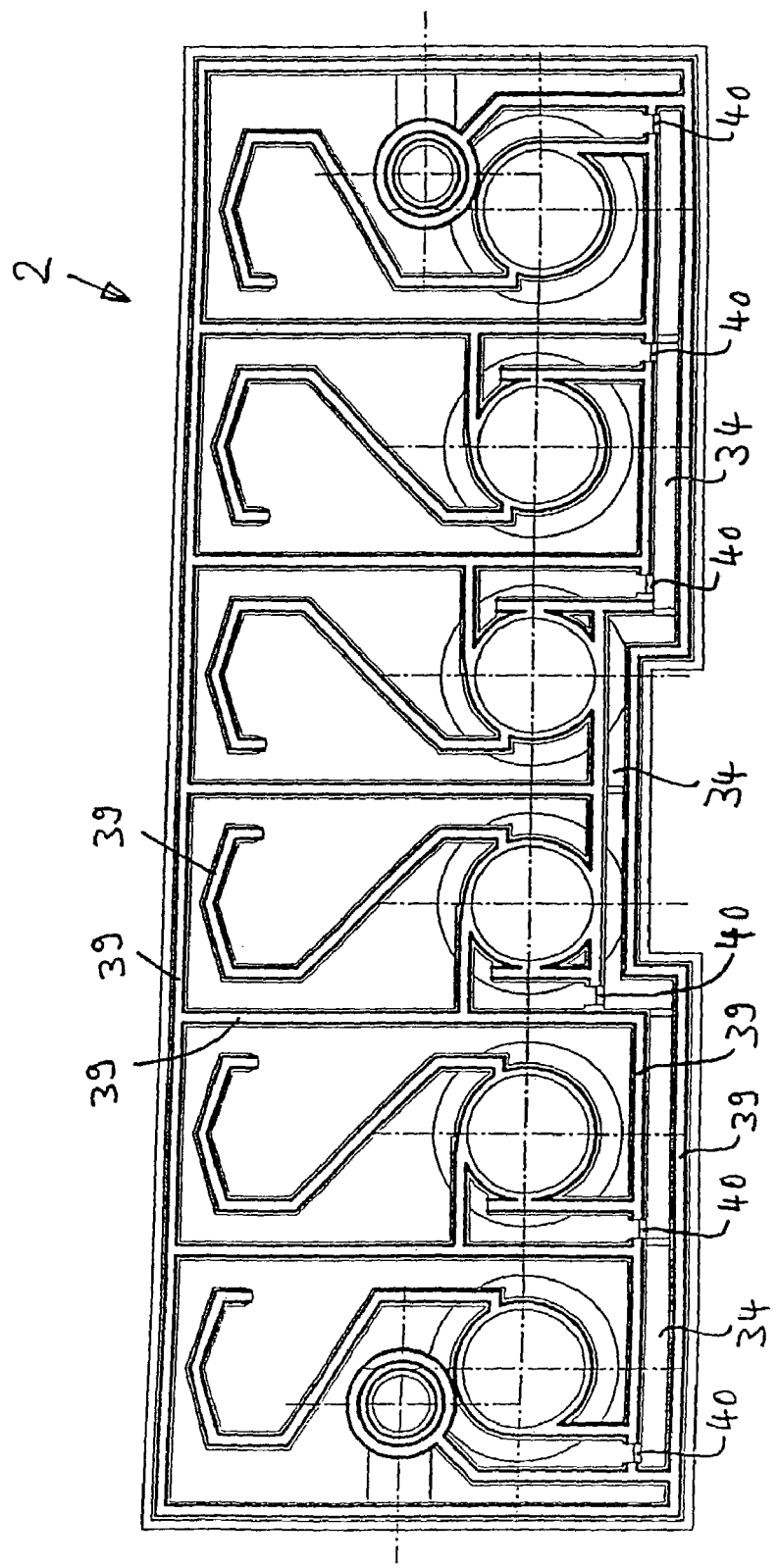

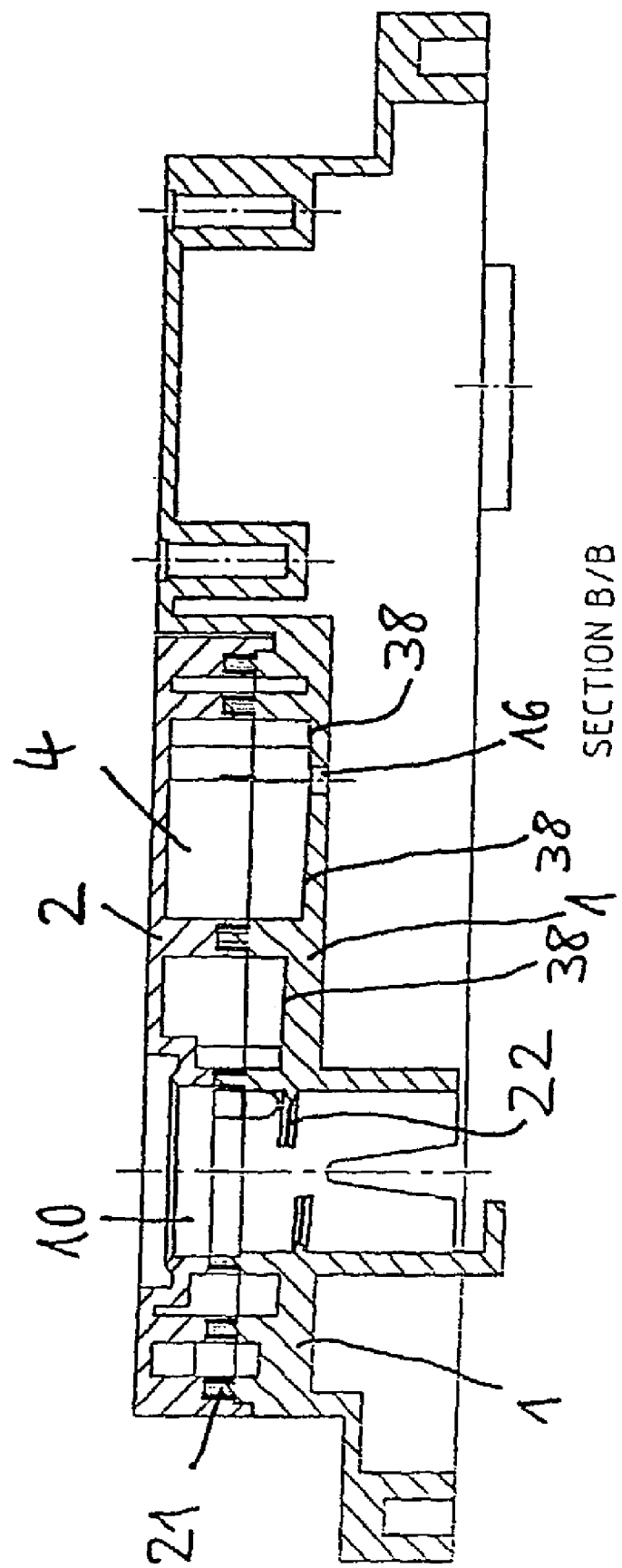

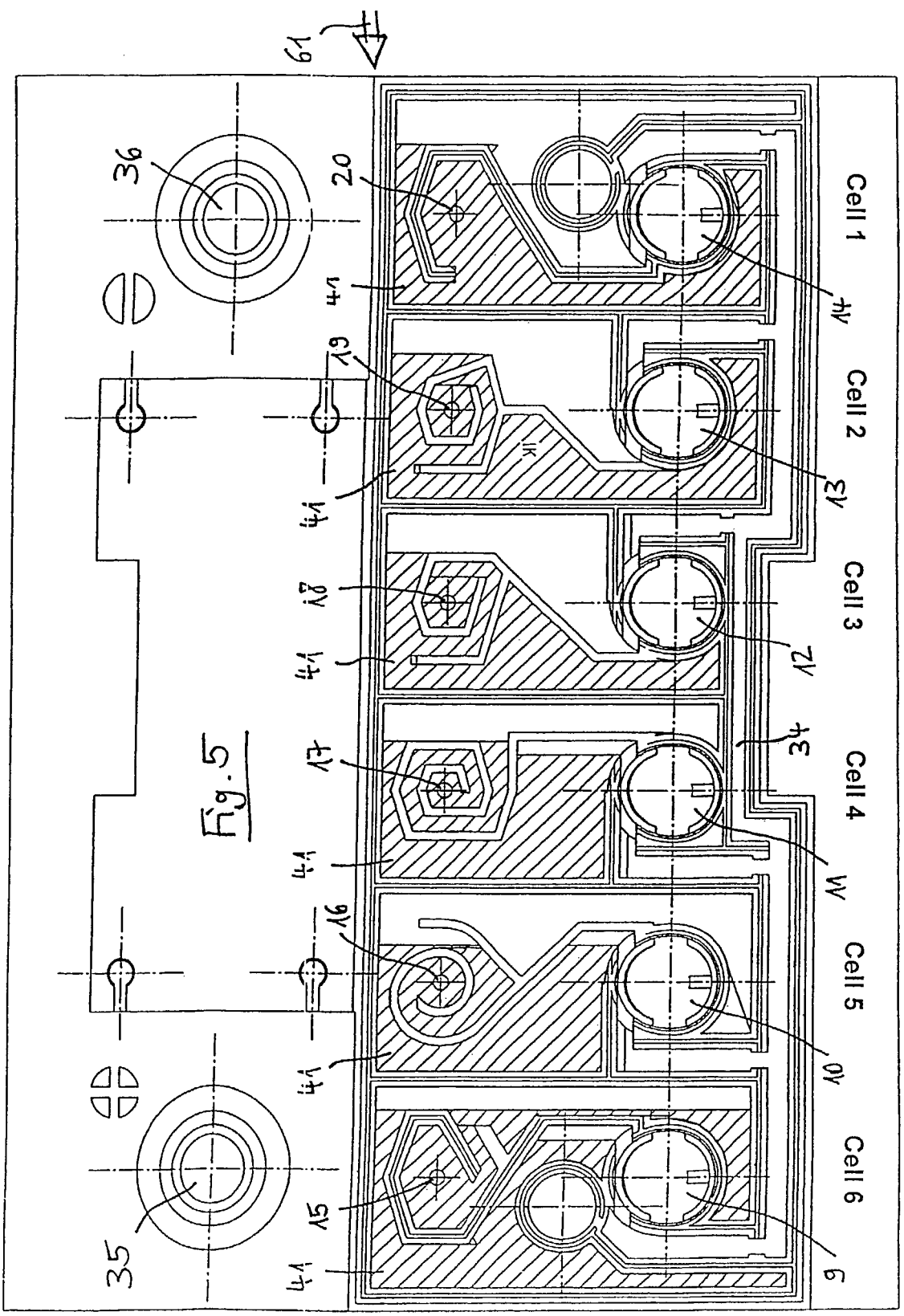

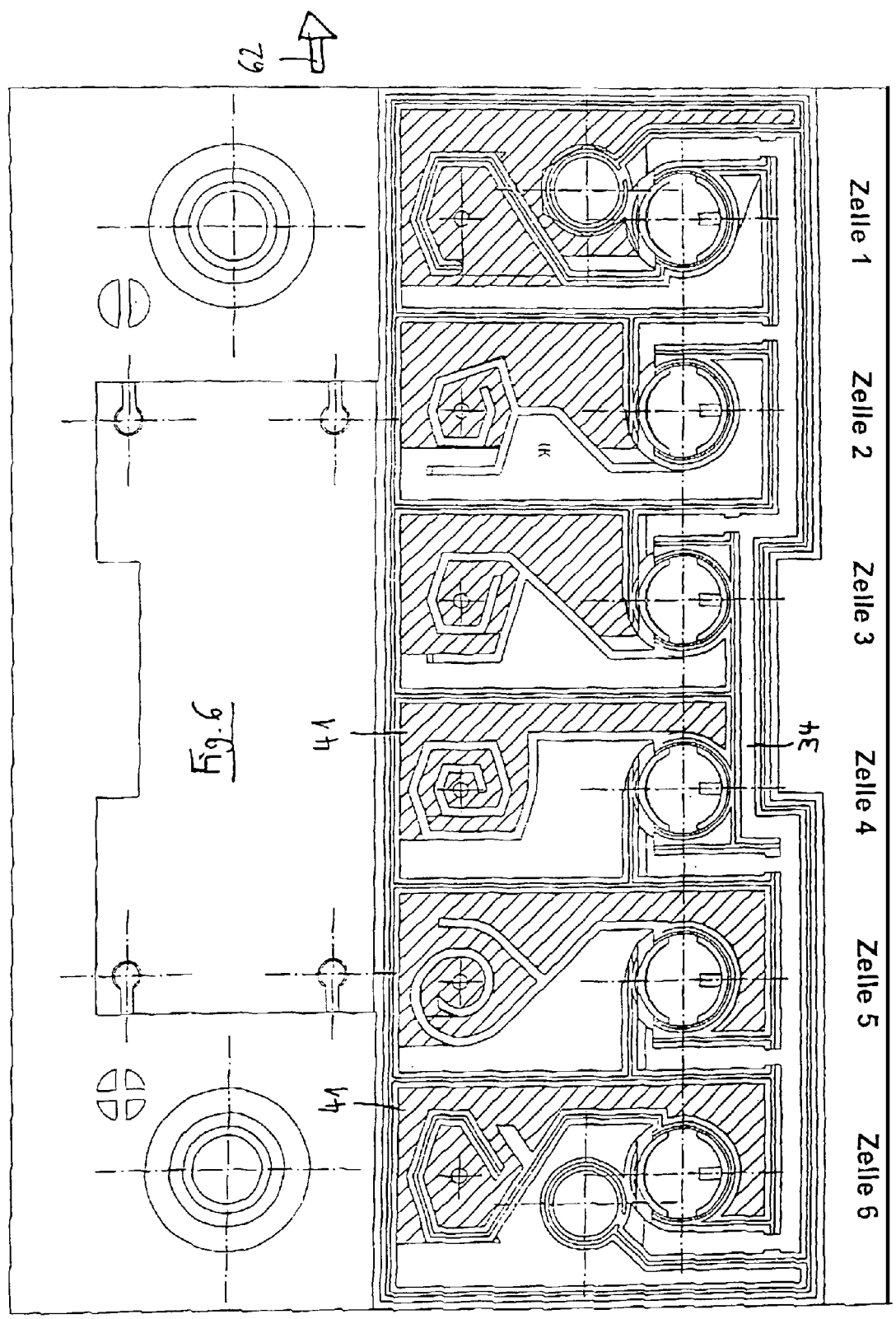

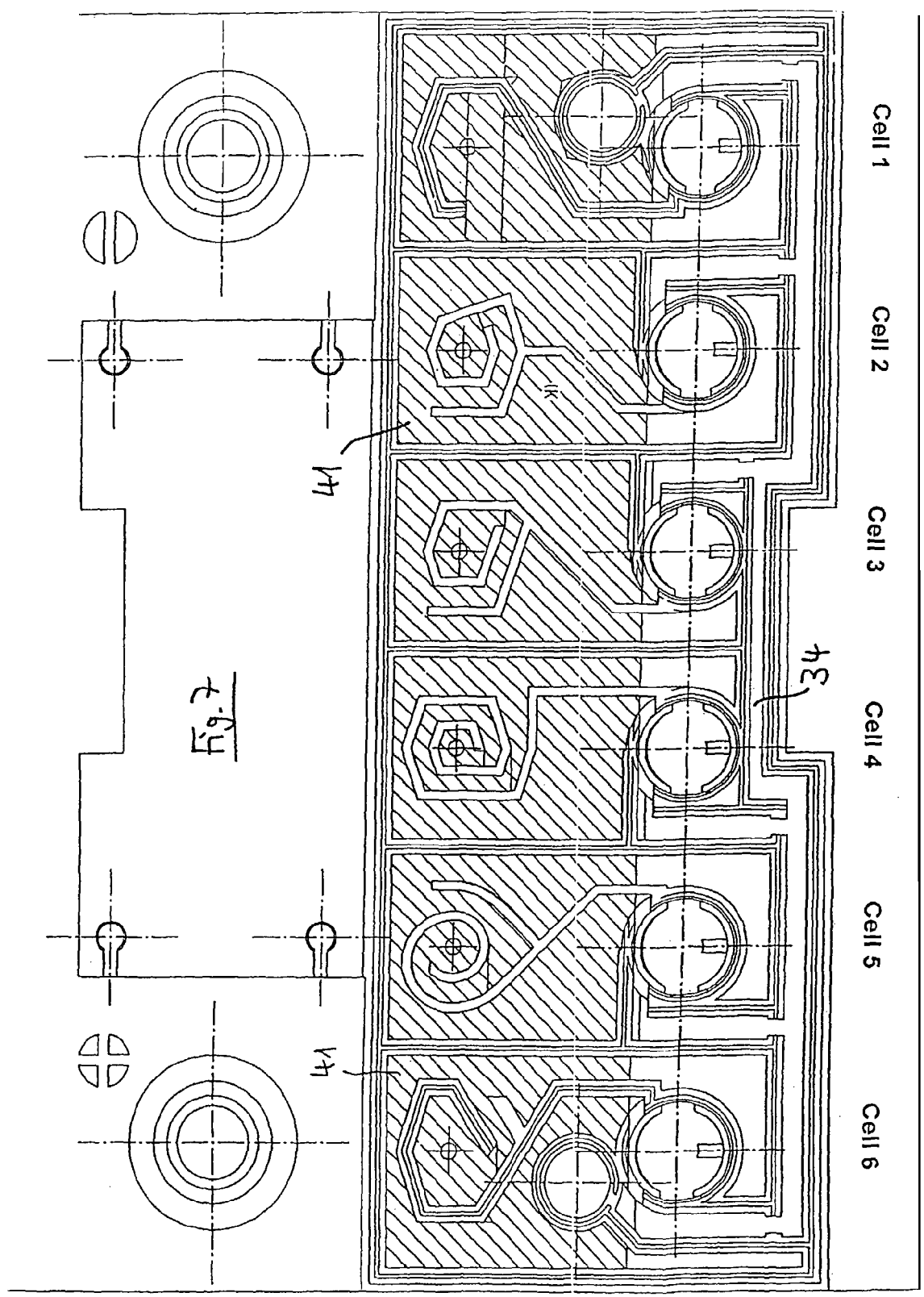

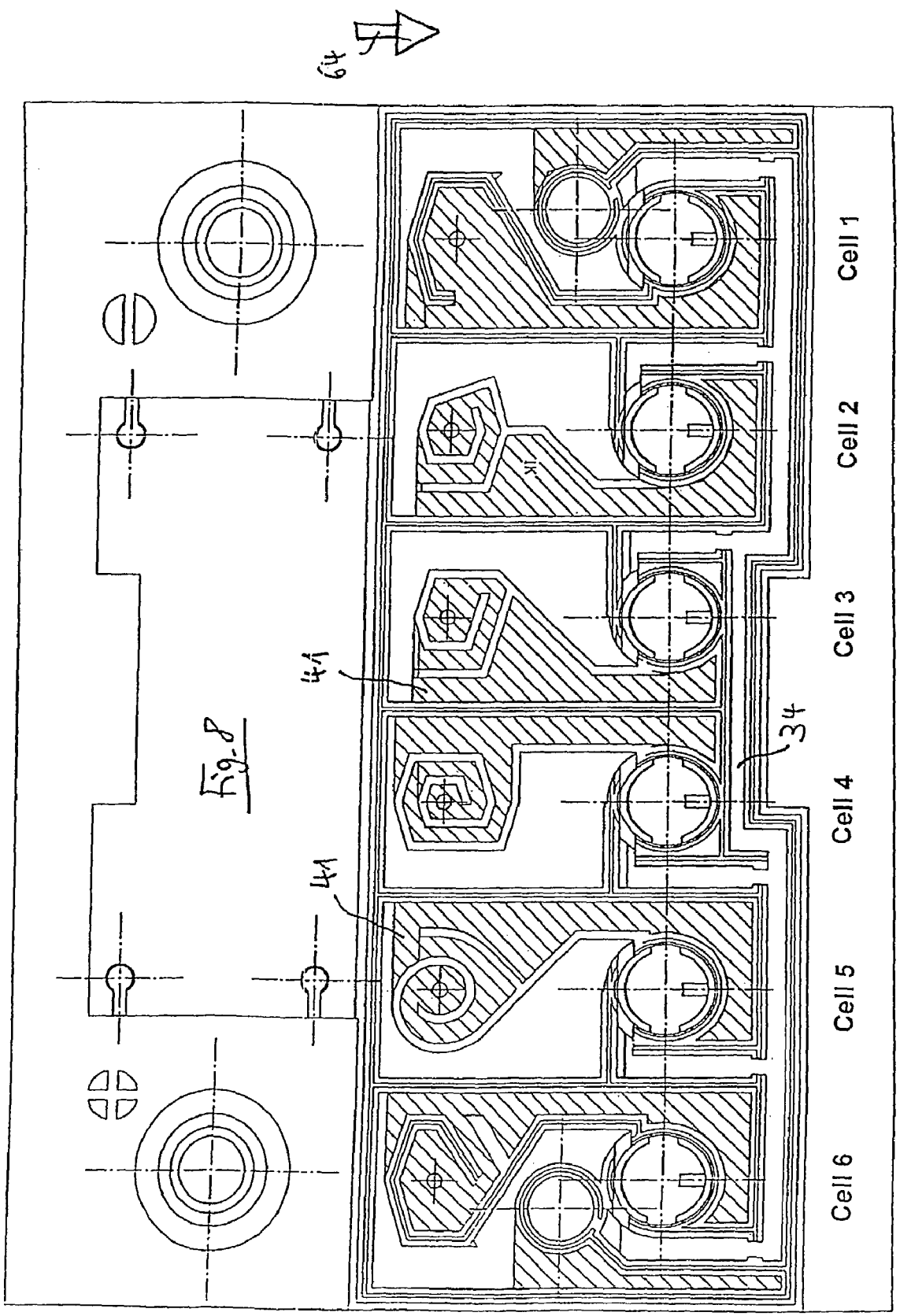

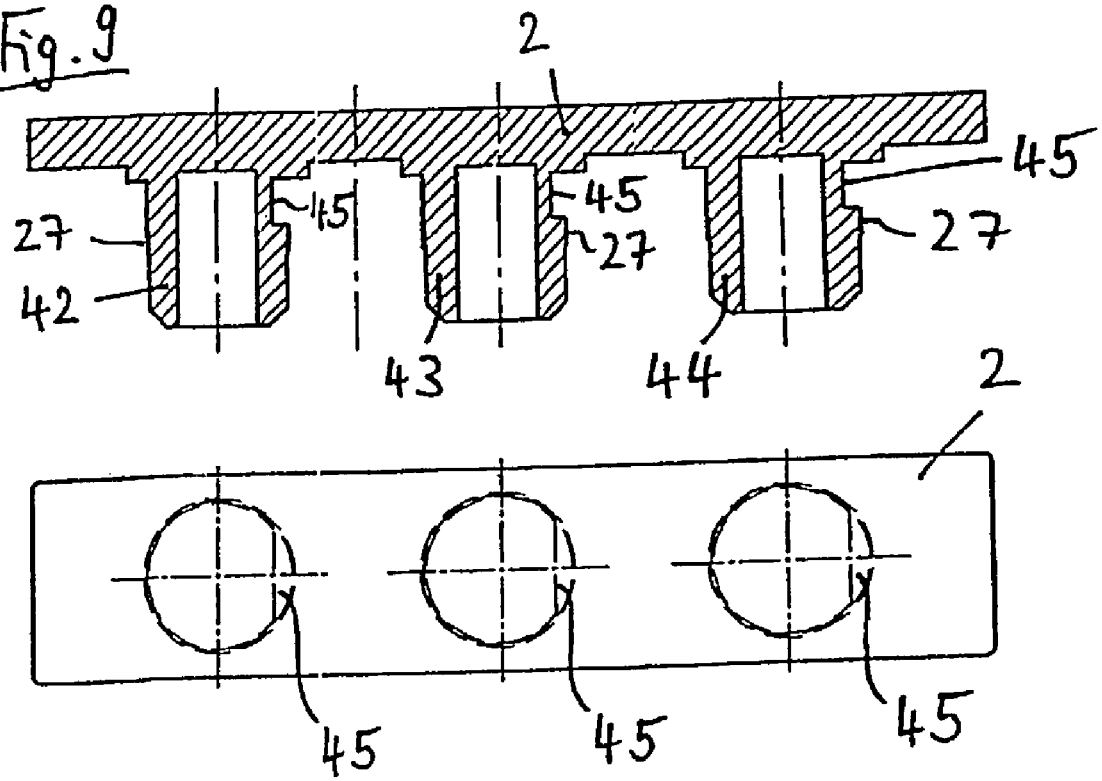
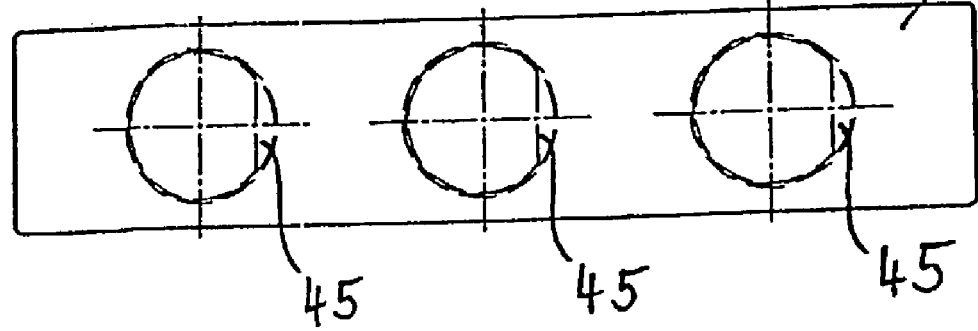
Installation layout
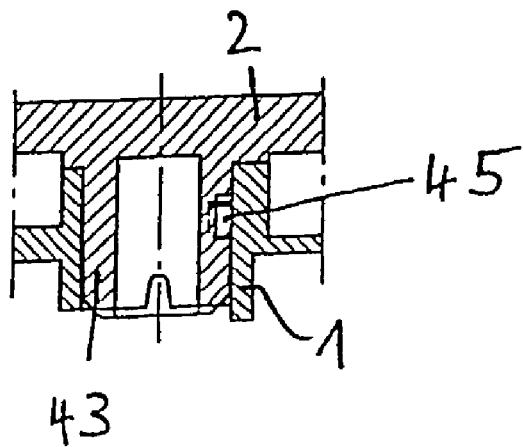

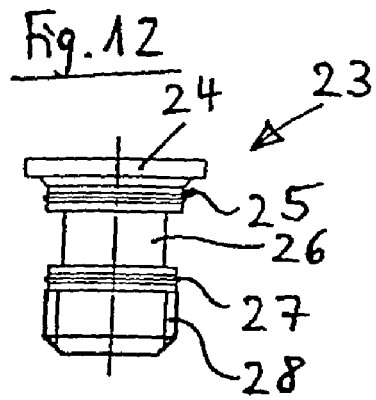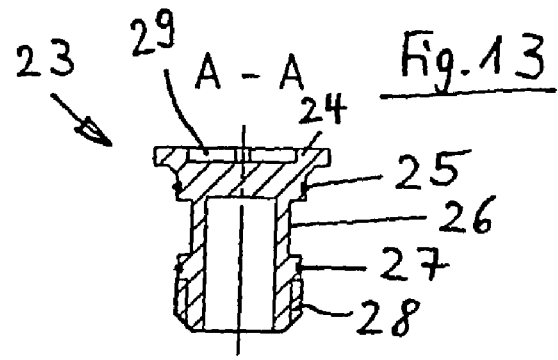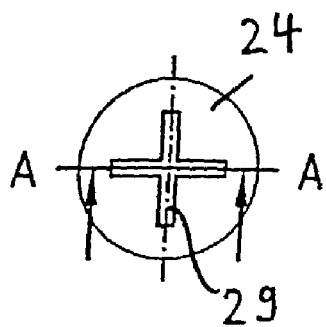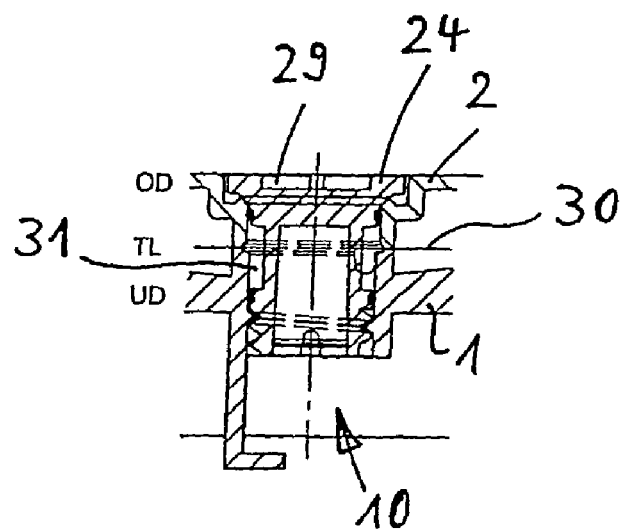

ACCUMULATOR WITH COVER HAVING TIP-SAFE FEATURES

The present invention relates to an accumulator, particularly a lead accumulator, according to the preamble of Claim 1.

These types of accumulators are used for various purposes, among other things as starter batteries for motor vehicles. The accumulator is filled with an acid or another electrolytic liquid. In the normal operating state, the accumulator is in a horizontal position, so that the acids cannot run out. In the event of an accident, the accumulator may be tipped, so that the danger arises that the acid will run out and cause damage.

An accumulator according to the preamble of Claim 1, which has a certain tip safety, is known from European Patent Application 0 570 703 A1. In this accumulator, there are sealing stoppers for the fill openings. The fill openings have semicircular expansions, through which the vent channels and gas outlets are formed, whose dimensions are such that in the event of brief tipping, no more acid may escape from the gas chamber of the cell than is received by the cavity assigned thereto. However, it is necessary to produce these expansions with a very high precision. The tool necessary for producing the cover parts must correspondingly be manufactured with a very high precision.

The object of the present invention is to suggest an improved tip-safe accumulator of the type initially specified.

According to the present invention, this object is achieved by the characterizing features of Claim 1. In the bottom cover, a gas outlet which discharges into the associated cavity is provided for each cell at a distance from the fill openings. The gas outlet is therefore not a component of the fill opening, but is at a distance thereto. In this case, the dimensions of the gas outlet are such that in the event of brief tipping of the accumulator, no more acid may escape from the cell than is received by the cavity assigned thereto.

Because the gas outlet is not a component of the fill opening, production is simplified. The fill openings may be produced and sealed in a typical way, through sealing stoppers, which may be implemented as projections on the top cover or as separate sealing stoppers. It is merely necessary to maintain the tolerances for the production of the gas outlet, without the interaction with further components, particularly with the tolerances of the sealing stoppers, having to be taken into consideration in this case.

The dimensions of the respective gas outlet are such that in the event of tipping of the accumulator, no air may enter the cell through the gas outlet. The gas outlet is therefore at most so large that no air may flow in as the acid flows out. However, it is made large enough that the acids may run back into the cell after the end of the tipping, i.e., when the accumulator has reassumed its normal position. In this way, because air cannot simultaneously flow through the gas outlet into the cell as the acid flows through this gas outlet, it is ensured that as the quantity of acid flowing out of the cell increases, a partial vacuum forms in this cell, which becomes greater as more acid flows out and which prevents further acid from flowing out when the respective cavity is filled, at the latest. The cavity is dimensioned in such a way that this condition is maintained.

Advantageous refinements are described in the subclaims.

Preferably, each cavity includes a first region and a second region, which are each connected to a region of the fill opening. A flow path, which connects the two regions to one another, may be implemented in the region of the fill opening. For example, the fill openings may be sealed by sealing stoppers or by projections provided on the top cover, the sealing stoppers and/or projections able to be sealed both in relation to the bottom cover and in relation to the top cover. There may be a flow path in the region between the seals, through reduction of the diameter of the sealing stoppers and/or projections in this region, for example, so that a ring chamber is formed, which is a component of the flow path. In this way, the respective cavities in the block cover may each comprise two regions, which are connected by the respective fill opening.

A further advantageous refinement is distinguished in that a fill opening is provided with a diagnosis probe ("magic eye"), particularly with a diagnosis probe according to German Utility Model 298 21 994 U, which has a probe body, on which a lens having at least one float ball, a thread, and a screw-in head is provided. The diagnosis probe is used for monitoring the acid level in the battery. It may be screwed or plugged into the bottom cover. It is advantageous if the entire top cover, or at least the region in which the diagnosis probe is located, is made of transparent material.

The top cover may be permanently bonded to the bottom cover, particularly welded.

However, it is also possible that the top cover is detachably connectable or detachably connected to the bottom cover, particularly clipped or screwed on to the bottom cover.

The top cover may be equipped with an elastic sealing contour. This is particularly advantageous if the top cover is implemented as a 2-component part and/or is removably connected to the bottom cover, particularly clipped or screwed onto the bottom cover.

The bottom cover may have a groove-shaped contour to seal the top cover. This is particularly advantageous if the top cover is removably connected to the bottom cover, particularly clipped or screwed onto the bottom cover.

A further advantageous refinement is distinguished in that the fill openings are each sealed or sealable by a sealing stopper.

The sealing stoppers preferably have a first seal in relation to the top cover and a second seal in relation to the bottom cover.

The sealing stoppers are preferably produced from 2-component plastic, i.e., implemented as a 2-component part.

There may be a tangential gas flow path between the sealing stoppers and the fill openings which receive them. For this purpose, the sealing stoppers may have a reduced cross-section or diameter in the region between the seals, so that a ring chamber to the fill opening is formed, which is a component of the gas flow path.

The gas outlets may have a circular cross-section. In order to ensure that, in the event of brief tipping of the accumulator, no more acid may escape from the cell than is received by the cavity assigned thereto, the diameter of the respective gas outlet may be 2 to 4 mm, preferably 3 mm.

The gas outlets may be designed in a funnel shape. In this way, the backflow of the acid may be improved.

A further advantageous refinement is distinguished in that the cavities are subdivided into one or more chambers by walls. It is advantageous if the chambers are designed in a labyrinth shape. The chambers are thus preferably designed in such a way that a labyrinth system results. In this way the respective cavity may be used advantageously, in particular, even in the event of different tipping directions of the accumulator.

The wall closest to the gas outlet is preferably implemented in such a way that it delimits a spiral chamber. The spiral preferably extends over 360° or more, also preferably over 450° or more. In this way, the volume of the cavity is well used.

It is advantageous if the outlet cross-section of one or more chambers is exactly as large as the cross-section of the gas outlet. This is particularly advantageous if the chambers are designed in a labyrinth shape and/or if there is a spiral chamber.

The bottom cover preferably has a slope which leads to the gas outlet. In this way, the acid which enters the cavity in the event of tipping will run back into the cell when the accumulator reassumes its normal position.

The backflow surfaces in the bottom cover may have a faceted and/or continuous slope to the gas outlet.

An advantageous refinement is distinguished in that the bottom cover has a surface texture, which is directed in the direction toward the gas outlet, in the region of the slope.

The cavities advantageously discharge into a central vent channel, at whose end one or more vent openings may be provided. The vent channel is preferably located on a long side of the accumulator. It is preferably arranged in such a way that it is ensured that, if the accumulator tips, no acid may reach the vent channel.

There may be one or more, particularly two, end chambers at the end(s) of the central vent channel, one or more of which may be equipped with a flashback preventer, particularly a flashback preventer frit.

A further advantageous refinement is distinguished in that the top cover has walls which form overflow barriers in the upside-down position of the accumulator. In this way, the tip safety is improved even upon tipping of the accumulator by 180°. The overflow barriers are implemented sufficiently high that the escaping acid does not rise over them.

According to a further advantageous refinement, the top cover is designed as a flat plate.

Figure 16:
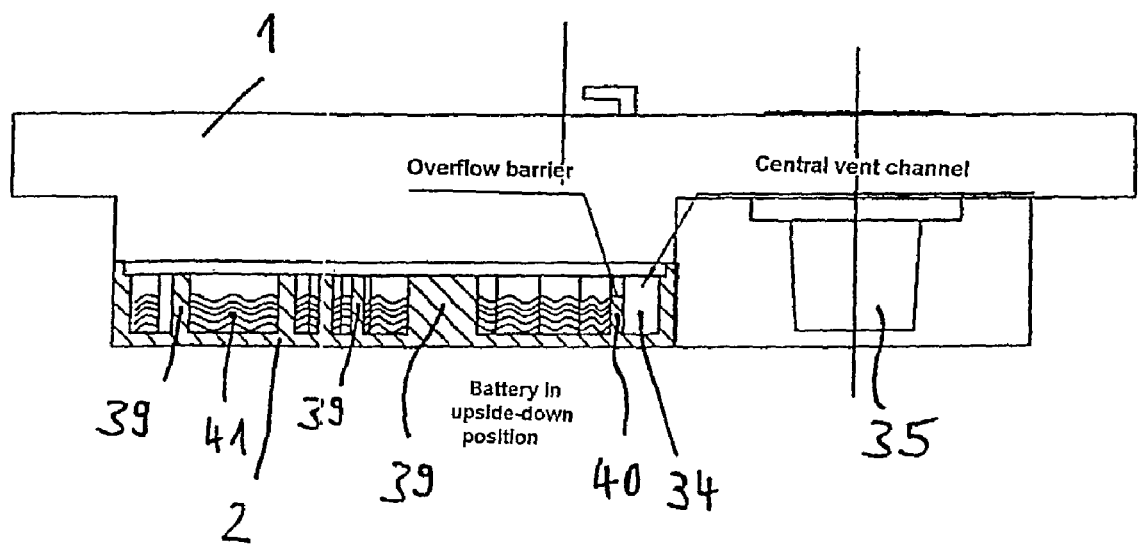
Figure 17:
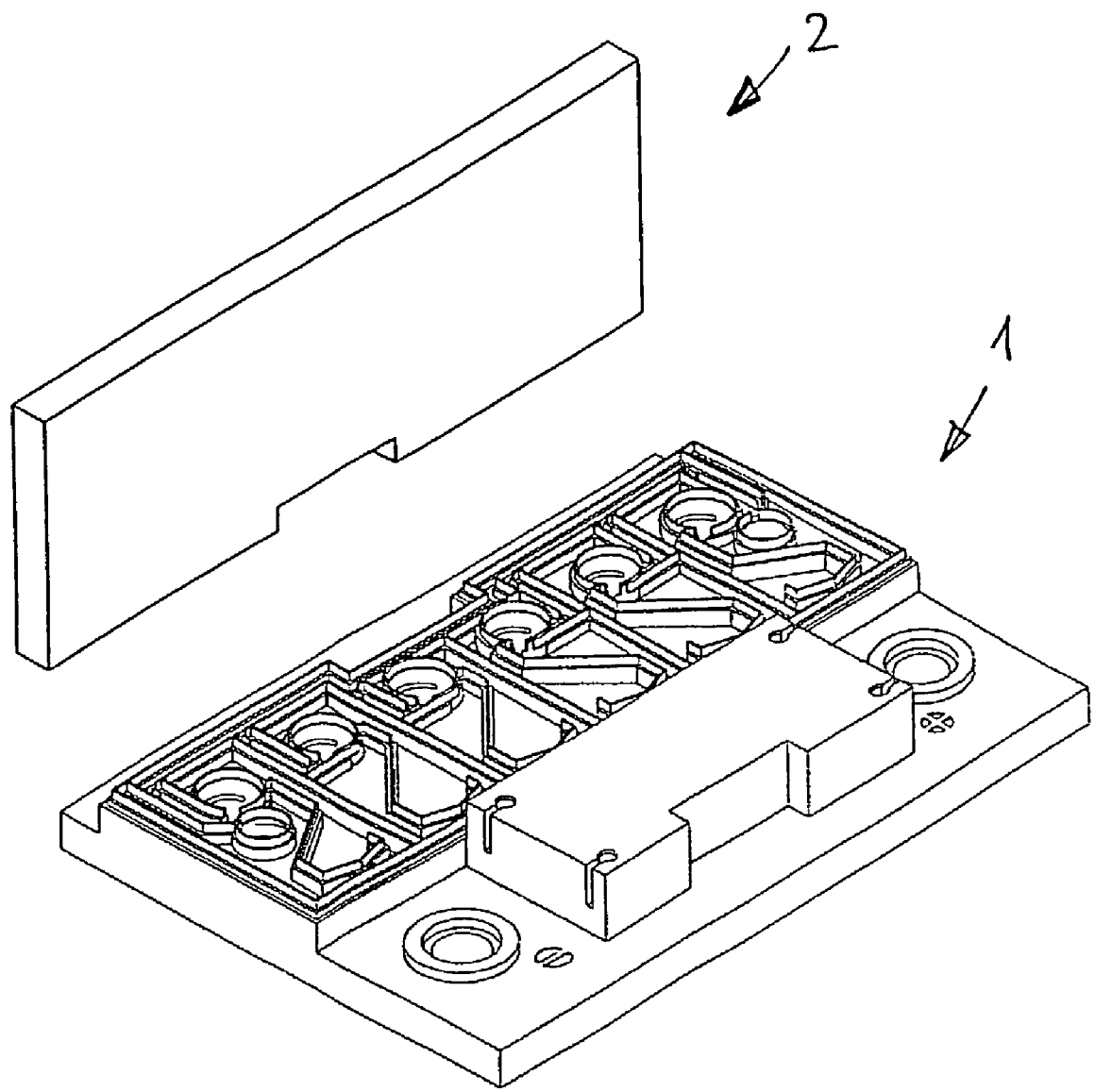

Exemplary embodiments of the present invention are explained in detail in the following with reference to the attached drawing. In the drawing FIG. 1 shows a bottom cover and a top cover in a perspective view, FIG. 2 shows the bottom cover from FIG. 1 in a view from above, FIG. 3 shows an alteration of the top cover in a view from below, FIG. 4 shows a cross-section through a block cover in the region of a cell, FIG. 5 shows an alteration of the bottom cover with a schematic illustration of the acid level in the cavities if the accumulator is tipped to the left, FIG. 6 shows the bottom cover shown in FIG. 5 with a schematic illustration of the acid level if the accumulator is tipped to the right, FIG. 7 shows the top cover shown in FIGS. 5 and 6 with a schematic illustration of the acid level if the accumulator is tipped to the front, FIG. 8 shows the top cover shown in FIGS. 5 to 7 with a schematic illustration of the acid level if the accumulator is tipped to the rear, FIG. 9 shows a top cover having three stopper projections in a cross-section, FIG. 10 shows the top cover from FIG. 9 in a view from above, FIG. 11 shows a stopper projection of the top cover from FIGS. 9 and 10 inside the associated fill opening in a cross-sectional illustration, FIG. 12 shows a sealing stopper in a side view, FIG. 13 shows the sealing stopper shown in FIG. 12 in a cross-section, FIG. 14 shows the sealing stopper shown in FIGS. 12 and 13 in a view from above, FIG. 15 shows the sealing stopper shown in FIGS. 12 to 14 inside the associated fill opening in a cross-sectional illustration, FIG. 16 shows a block cover in the event of tipping of the accumulator by 180°, partially in section, and FIG. 17 shows a block cover in which the top cover is designed as a flat plate.

Figure 2:
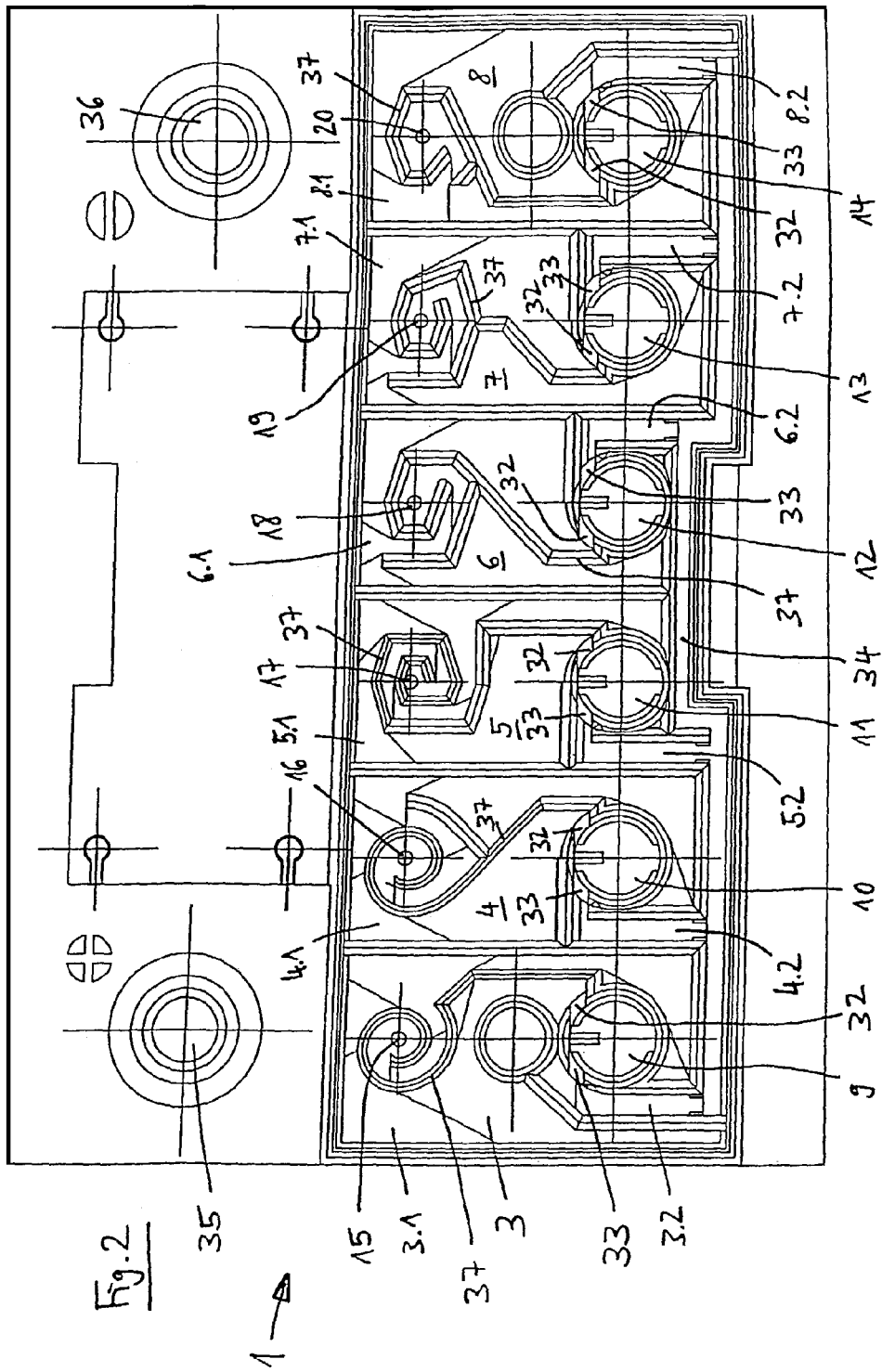

The block cover of an accumulator illustrated in FIG. 1 comprises a bottom cover 1 and a top cover 2, between which a gas chamber for acid separation is implemented, which is subdivided into six cavities 3, 4, 5, 6, 7, 8, so that there is a cavity 3-8 for each of the six cells of the accumulator. A fill opening 9, 10, 11, 12, 13, 14 is provided for each cell in the bottom cover.

A gas outlet 15, 16, 17, 18, 19, 20 is provided for each cell in bottom cover 1, which discharge into associated cavities 3-8 and whose dimensions are such that in the event of brief tipping of the accumulator, no more acid may escape from the cell than is received by cavity 3-8 assigned thereto. Gas outlets 15-20 have a circular cross-section with a diameter of 3 mm. They are illustrated in FIG. 2, which shows a view of bottom cover 1 from above.

As may be seen in FIG. 4, top cover 2, which is produced from 2-component plastic, is equipped with an elastic sealing contour 21 and is removably attachable to bottom cover 1. Top cover 1 has a trough-shaped contour to seal top cover 2.

Fill openings 9-14 may each be sealed by a sealing stopper. For this purpose, there is a thread 22, into which a sealing stopper may be screwed, in each fill opening, and therefore also fill opening 10, shown in cross-section in FIG. 4.

FIGS. 12-15 show an exemplary embodiment of a sealing stopper 23, which has a head 24, a first seal 25 for sealing in relation to top cover 2, a region 26 of smaller diameter, a second seal 27 for sealing in relation to bottom cover 1, and an external thread 28, using which sealing stopper 23 may be screwed into internal thread 22 of fill opening 10. There is a cross-shaped depression 29 in head 24, into which an appropriate tool may be inserted in order to screw or unscrew sealing stopper 23.

In the embodiment shown in FIG. 15, bottom cover 1 and top cover 2 are welded along partition plane 30. Partition plane 30 lies in the region 26 of the sealing stopper. A ring chamber 31, through which the gases liberated from the acid and/or, in case of tipping, acid may flow, is formed between this region 26 of sealing stopper 23, which has a smaller diameter, and the opposite wall of fill opening 10.

Cavities 3-8 comprise, as may be seen in FIG. 2, a first region 3.1, 4.1, 5.1, 6.1, 7.1, 8.1 and a second region 3.2, 4.2, 5.2, 6.2, 7.2, 8.2, which are each connected to a region of associated fill opening 9-14, namely to the ring chamber between the sealing stopper and the wall of the fill opening, i.e. ring chamber 31 in FIG. 15, for example. This ring chamber may extend around the entire circumference of the sealing stopper, i.e., around 360°, however, it may also only extend around only part of the circumference.

As may be seen in FIG. 2, gas outlets 15-20 lie in first regions 3.1-8.1 of cavities 3-8. They are connected by junction points 32 to a region of associated fill opening 9-14. Second regions 3.2-8.2 of cavities 3-8 are each connected by a outlet 33 to a region of associated fill opening 9-14. Second regions 3.2-8.2 discharge into a central vent channel 34, which runs along one long side of the accumulator, namely the long side which lies opposite end poles 35, 36.

Cavities 3-8 are subdivided by walls 37 into chambers, which are designed in a labyrinth shape. Various labyrinth designs are shown in FIG. 2, a different variant being illustrated in each of the six cavities for reasons of simplified depiction. In practice, the same shape or a mirror-symmetric shape of a labyrinth-shaped chamber would be used for each cavity 3-8.

In the six embodiments shown in FIG. 2, walls 37 lying closest to respective gas outlets 15-20 are implemented in such a way that they delimit a spiral chamber, the spirals in cavities 3-7 extending over 450° or more. In cavity 8, the spiral extends over somewhat more than 360°.

As shown in FIG. 4, bottom cover 1 has a slope leading to respective gas outlet 15-20, i.e., in FIG. 4, a slope of backflow surface 38 to gas outlet 16 which runs continuously. Backflow surface 38 is rough and has a surface texture which is directed in the direction toward gas outlet 16 and which promotes or eases the backflow of the acid therein.

Top cover 2 has walls 39 (FIG. 3 and FIG. 16), which form overflow barriers in the upside-down position of the accumulator. They may be arranged in such a way that walls 39 of top cover 2 rest on corresponding walls of bottom cover 1 and there are overflow barriers 40 toward central vent channel 34, whose height is lower, but which are still tall enough that even in case of a upside-down position of the accumulator, which is shown in FIG. 16, acid 41 in the cavities does not reach above overflow barriers 40 and therefore no acid may penetrate into central vent channel 34.

Further embodiments of cavities are shown in FIGS. 5 to 8. In FIG. 5, the space which acid 41 occupies if the accumulator is tipped to the left, i.e., in the direction of arrow 61, is shown crosshatched. FIG. 6 shows the corresponding relationships if the accumulator is tipped to the right, i.e., in the direction of arrow 62, FIG. 7 if the accumulator is tipped forward, i.e., in the direction of arrow 63, and FIG. 8 if the accumulator is tipped to the rear, i.e., in the direction of arrow 64. In all cases, the volumes of the cavities are dimensioned in such a way and the walls in the cavities are designed in such a way that acid 41 is reliably retained and is particularly prevented from penetrating into central vent channel 34. In FIGS. 1, 2, and 5 to 8, a different configuration of walls 37 is shown for each cavity 3 to 8. In the actual batteries produced, it is advantageous if one of these configurations is used for all six cavities 3-8.

FIGS. 9-11 show an embodiment in which the fill openings are not sealed by individual sealing stoppers, but by stopper projections 42, 43, 44, which are implemented on top cover 2. Since the top cover is in one piece with stopper projections 42-44, first seals 25 are not necessary. Second seals 27 are formed by teeth. Flattened recesses 45 are provided in stopper projections 42 44 above teeth 27, which form a flow path for gases separated from the acid and, in case of tipping, for acid.

During operation of the accumulator, gases separated from the acid may reach first regions 3.1-8.1 of cavities 3-8 through gas outlets 15-20 and from there, via junction points 32, fill openings 9-14, outlets 33, and second regions 3.2-8.2, central vent channel 34, in whose end chambers there are flashback preventer frits which separate the acid.

In case of tipping of the accumulator, acid enters cavities 3-8 through gas outlets 15-20, no more acid able to escape from the cells than may be received by respective assigned cavities 3-8. When the accumulator reassumes its normal position, the acid flows back through the slope of backflow surfaces 38 to gas outlets 15-20 and through them into the cells.

In the exemplary embodiment shown in FIG. 17, top cover 2 is designed as a flat plate.

The invention claimed is:

1. An accumulator having a housing which comprises a number of cells and a block cover which closes the housing, and which comprises a lower cover (1) and an upper cover (2) between which forms a gas space for acid separation, said gas space is sub-divided into a plurality of hollow spaces (3-8), in accordance with the number of cells and which has at least one gas discharge opening, a filling opening (9-14) and a gas outlet location (15-20), which opens in the associated hollow space (3-8) being provided with spacing from the filling opening (9-14) in the lower cover (1), for each cell, wherein each gas outlet location (15-20) is of such size that when the accumulator is tilted for a short time with an increasing flow of acid out of the cell, a reduced pressure is formed in that cell and prevents the acid from continuing to flow out when the respective hollow space (3-8) is full so that no more acid can be discharged from the cell than is received by the hollow space (3-8) which is associated therewith, wherein each hollow space (3-8) comprises a first region (3.1-8.1) and a second region (3.2-8.2) that discharges into said gas discharge opening, wherein said first region (3.1-8.1) and said second region (3.2-8.2) are each connected to a region of the filling opening (9-14), wherein said housing additionally comprises a plurality of sealing stoppers (23) such that the filling openings (9-14) are each sealed or sealable by a respective sealing stopper (23), wherein the respective sealing stoppers (23) each have a first seal (25) in relation to the upper cover (2) and a second seal (27) in relation to the lower cover (1), wherein a tangential gas flow path is defined between the respective sealing stoppers (23) and filling openings (9-14) which receive the respective sealing stoppers and, wherein the flow path is designed as a ring chamber (31) between the first and second seals (25, 27), said accumulator further comprising a central vent channel (34) arranged such that the hollow spaces (3-8) are arranged to discharge the acid into the central vent channel (34) having at least two chambers.

2. The accumulator according to claim 1, wherein each said filling opening (9-14) further comprises a diagnosis probe.

3. The accumulator according to claim 1, wherein the upper cover (2) is permanently bonded to the lower cover (1).

4. The accumulator according to claim 1, wherein the upper cover (2) is detachably connectable to the lower cover (1).

5. The accumulator according to claim 4, wherein the upper cover (2) is equipped with an elastic sealing contour (21).

6. The accumulator according to claim 4, wherein the lower cover (1) has a trough-shaped contour to seal the upper cover (2).

7. The accumulator according to claim 1, wherein the respective sealing stoppers (23) are each produced from 2-component plastic.

8. The accumulator according to claim 1, wherein each said gas outlet location (15-20) has a circular cross-section.

9. The accumulator according to claim 1, wherein each said gas outlet location (15-20) is funnel-shaped.

10. The accumulator according to claim 1, wherein the hollow spaces (3-8) are each further subdivided into first and second regions (3.1-8.1; 3.2-8.2) by walls (37).

11. The accumulator according to claim 10, wherein a wall lying closest to the gas outlet locations (15-20) defines a spiral-shaped chamber.

12. The accumulator according to claim 10, wherein a cross-section of each said second region (3.2-8.2) located adjacent to an associated gas outlet location (15-20) has the same size as a cross-section of the associated gas outlet location (15-20).

13. The accumulator according to claim 10, wherein the lower cover (1) is sloped leading to the gas outlets locations (15-20).

14. The accumulator according to claim 13, wherein the lower cover (1) is continuously sloped.

15. The accumulator according to claim 13, wherein the lower cover (1) has a roughened, sloped surface structure in the region toward the gas outlets locations (15-20).

16. The accumulator according to claim 1, wherein one or both of the at least two end chambers of the central vent channel (34) is equipped with a flashback preventer.

17. The accumulator according to claim 1, wherein the upper cover (2) has walls (39) which form overflow barriers (40) in an upside-down position of the accumulator.

18. The accumulator according to claim 1, wherein the upper cover (2) is shaped as a flat plate.

19. The accumulator according to claim 10, wherein the first and second regions (3.1-8.1; 3.2-8.2) are shaped as a labyrinth.

20. The accumulator according to claim 3, wherein the upper (2) and lower (1) covers are welded together.

21. The accumulator according to claim 4, wherein the upper cover (2) is arranged to be clipped or screwed onto the lower cover (1).

22. The accumulator according to claim 11, wherein a spiral of the spiral-shaped chamber extends over at least 450°.

23. The accumulator according to claim 13, wherein slope of the lower cover (1) is faceted.

24. The accumulator according to claim 1, wherein size of the gas outlet locations (15-20) are dimensioned to prevent air from flowing into cells upon the brief tipping as the acid flows out of the accumulator therethrough, and upon the accumulator resuming normal position after tipping, direct the acid to flow back into the respective cells.

25. The accumulator of claim 1 wherein the sealing stoppers (23) each have a region (26) of smaller diameter so as to provide a ring chamber (31) between said region of smaller diameter and an opposite wall of the respective filling opening (9-14) into which the sealing stopper (23) is received and through which gases and acid can flow.

26. The accumulator of claim 1 wherein the vent channel (34) extends along one long side of the accumulator.

* * * * *